US011832251B2

(12) United States Patent
Hajri et al.

(10) Patent No.: US 11,832,251 B2
(45) Date of Patent: Nov. 28, 2023

(54) APPARATUS FOR CSI PREDICTION CONTROL

(71) Applicant: Nokia Technologies Oy, Espoo (FI)

(72) Inventors: Salah Eddine Hajri, Antony (FR); Mihai Enescu, Espoo (FI); Frederick Vook, Schaumburg, IL (US)

(73) Assignee: Nokia Technologies Oy, Espoo (FI)

( * ) Notice: Subject to any disclaimer, the term of this patent is extended or adjusted under 35 U.S.C. 154(b) by 81 days.

(21) Appl. No.: 17/335,485

(22) Filed: Jun. 1, 2021

(65) Prior Publication Data
US 2022/0386292 A1    Dec. 1, 2022

(51) Int. Cl.
| | |
|---|---|
| *H04L 12/26* | (2006.01) |
| *H04W 72/20* | (2023.01) |
| *H04L 5/00* | (2006.01) |
| *H04B 7/06* | (2006.01) |
| *H04W 24/08* | (2009.01) |
| *H04W 72/541* | (2023.01) |

(52) U.S. Cl.
CPC .......... *H04W 72/20* (2023.01); *H04B 7/0626* (2013.01); *H04L 5/0048* (2013.01); *H04W 24/08* (2013.01); *H04W 72/541* (2023.01)

(58) Field of Classification Search
CPC ............. H04W 72/0406; H04W 24/08; H04W 72/082; H04B 7/0626; H04L 5/0048
USPC .......... 370/236, 254–255, 328–330, 335–345
See application file for complete search history.

(56) References Cited

U.S. PATENT DOCUMENTS

| | | | |
|---|---|---|---|
| 2021/0050979 A1* | 2/2021 | Hui | H04L 5/0064 |
| 2021/0091838 A1 | 3/2021 | Bai et al. | 7/626 |
| 2021/0105812 A1* | 4/2021 | Rastegardoost | H04L 1/08 |
| 2021/0144726 A1* | 5/2021 | Hui | H04W 72/085 |
| 2021/0243782 A1* | 8/2021 | Miao | H04L 1/1854 |
| 2021/0376895 A1* | 12/2021 | Xue | H04L 1/1861 |

FOREIGN PATENT DOCUMENTS

| | | | | |
|---|---|---|---|---|
| EP | 3 576 312 A1 | 12/2019 | | |
| EP | 3576312 A1 * | 12/2019 | ........... | H04B 17/336 |
| WO | WO-2015/199588 A1 | 12/2015 | | |

* cited by examiner

*Primary Examiner* — Thai D Hoang
(74) *Attorney, Agent, or Firm* — Joseph C. Drish; Harrington & Smith

(57) ABSTRACT

An apparatus includes circuitry configured to: receive a radio resource control configuration including at least one channel state information reporting configuration indicating at least one channel state information quantity for which prediction is configured or enabled; receive at least one of a downlink reference signal and/or a downlink channel for at least one of channel measurement and/or interference measurement; determine the at least one channel state information quantity or at least one channel state information prediction model, based on at least one of a downlink reference measurement, and/or a downlink channel decoding outcome, and/or the at least one channel state information reporting configuration, and/or at least one prediction window; and transmit a channel state information report in uplink control information, based on the determining.

17 Claims, 9 Drawing Sheets

US 11,832,251 B2

APPARATUS FOR CSI PREDICTION CONTROL

TECHNICAL FIELD

The examples and non-limiting embodiments relate generally to communications and, more particularly, to an apparatus for channel state information (CSI) prediction configuration and control.

BACKGROUND

It is known to determine channel state information in a communication network.

SUMMARY

In accordance with an aspect, an apparatus includes at least one processor; and at least one non-transitory memory including computer program code; wherein the at least one memory and the computer program code are configured to, with the at least one processor, cause the apparatus at least to: receive a radio resource control configuration including at least one channel state information reporting configuration indicating at least one channel state information quantity for which prediction is configured or enabled; receive at least one of a downlink reference signal and/or a downlink channel for at least one of channel measurement and/or interference measurement; determine the at least one channel state information quantity or at least one channel state information prediction model, based on at least one of a downlink reference measurement, and/or a downlink channel decoding outcome, and/or the at least one channel state information reporting configuration, and/or at least one prediction window; and transmit a channel state information report in uplink control information, based on the determining.

In accordance with an aspect, an apparatus includes at least one processor; and at least one non-transitory memory including computer program code; wherein the at least one memory and the computer program code are configured to, with the at least one processor, cause the apparatus at least to: transmit a radio resource control configuration including at least one channel state information reporting configuration indicating at least one channel state information quantity for which prediction is configured or enabled; transmit at least one of a downlink reference signal and/or a downlink channel for at least one of channel measurement and/or interference measurement; transmit an indication of at least one prediction window used for a determination of the at least one channel state information quantity or at least one channel state information prediction model; and receive a channel state information report in uplink control information, based on a determination related to the at least one channel state information quantity or at least one channel state information prediction model, the determination having been performed with use of the at least one prediction window.

In accordance with an aspect, a method includes receiving a radio resource control configuration including at least one channel state information reporting configuration indicating at least one channel state information quantity for which prediction is configured or enabled; receiving at least one of a downlink reference signal and/or a downlink channel for at least one of channel measurement and/or interference measurement; determining the at least one channel state information quantity or at least one channel state information prediction model, based on at least one of a downlink reference measurement, and/or a downlink channel decoding outcome, and/or the at least one channel state information reporting configuration, and/or at least one prediction window; and transmitting a channel state information report in uplink control information, based on the determining.

BRIEF DESCRIPTION OF THE DRAWINGS

The foregoing aspects and other features are explained in the following description, taken in connection with the accompanying drawings.

DETAILED DESCRIPTION OF EXAMPLE EMBODIMENTS

Figure 1:
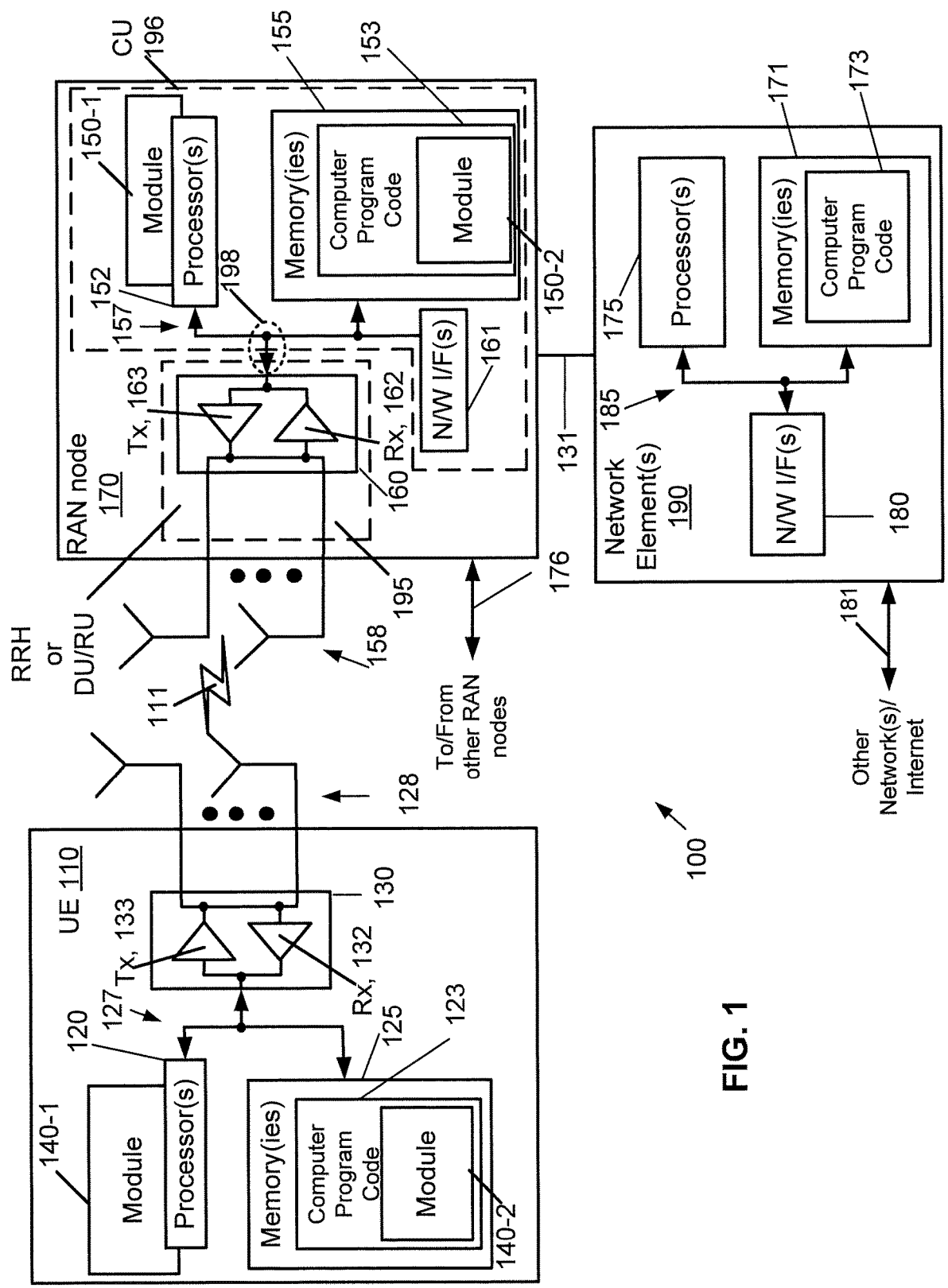
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under RAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, head mounted displays such as those that implement virtual/augmented/mixed reality, as well as portable units or terminals that incorporate combinations of such functions.

UE 110, RAN node 170, and/or network element(s) 190, (and associated memories, computer program code and modules) may be configured to implement (e.g. in part) the methods described herein, including CSI prediction according to indicated configurations and network control via downlink signaling. Thus, computer program code 123, module 140-1, module 140-2, and other elements/features shown in FIG. 1 of UE 110 may implement user equipment related aspects of the methods described herein. Similarly, computer program code 153, module 150-1, module 150-2, and other elements/features shown in FIG. 1 of RAN node 170 may implement gNB/TRP related aspects of the methods described herein. Computer program code 173 and other elements/features shown in FIG. 1 of network element(s) 190 may be configured to implement network element related aspects of the methods described herein.

Having thus introduced a suitable but non-limiting technical context for the practice of the example embodiments, the example embodiments are now described with greater specificity.

The examples described herein are related to CSI prediction configuration and control in NR. CSI prediction may be performed at the UE side using any of the suitable algorithms, which may be machine learning algorithms or simple filtering or interpolation operations. The description hereafter assumes that CSI prediction methods are left to UE implementation. However, the proposed scheme may be also used with configured prediction methods. Described herein is a framework in which CSI prediction can be controlled by the gNB. The gNB controls and configures one or more targeted prediction windows for each configured CSI quantity. The configured prediction windows may be common to all configured CSI quantities or be CSI quantity-specific. The UE can shift the prediction window for one or multiple reported CSI quantities based on its movement velocity and perceived channel conditions (e.g. Doppler shift), if allowed or configured accordingly.

Accurate CSI estimation is of paramount importance in any communications system. CSI quantities may provide the network with knowledge of the channel and interference states. In 5G NR systems, radio interface is based on an extensive use of beamforming techniques which require accurate knowledge of the channel state information to be able to perform accurate link adaptation and TX/RX beamforming. In the 5G NR system, similar to LTE, several rules are defined with respect to the computation of CSI quantities which may include, CQI, L1-RSRP, PMI, L1-SINR, RI, LI, CRI, SSBRI. Computing CSI quantities may require the measurements of interference, channel or both.

A UE may compute CSI quantities based on a single or multiple channel and interference measurements. Such behavior is controlled, in the current specification, by the two parameters timeRestrictionForInterferenceMeasurements and timeRestrictionForChannelMeasurements, both configurable in CSI-ReportConfig. The measurement intervals that a UE may consider can be either restricted or unrestricted; ii) In case of restricted measurements, these are based on the latest measured sample; iii) No particular specification is made with respect to the way in which the CSI is computed based on multiple measurements. This aspect is left to UE implementation as per 3GPP specification until Rel-16. Also, no particular specification is made with respect to how this is done given a time horizon in the future.

Described herein are further details on the CSI computation, a framework in which CSI prediction can be configured and controlled by the gNB while also the amount of input/measured samples is taken into account. The described solution enables the efficient control of CSI prediction over a targeted prediction window for each configured CSI quantity, for which prediction is enabled or configured. This is achieved by indication or configuration of one or multiple prediction windows and enabling UE-centric prediction window selection and adaptation.

Having CSI prediction at the UE side is a very useful feature in the framework of radio access networks. Indeed, it enables, among other aspects, to combat CSI aging, which could lead to suboptimal beamforming and link adaption decisions, reduce downlink reference signals overhead and may reduce CSI reporting overhead.

It is however critical to establish common understanding between the network and UE on the targeted prediction window, as this conditions the model computation at the UE side and its usage or the usage of its outputs at the network side.

As UE hardware capabilities are ever increasing, it becomes possible to envisage using powerful machine learning algorithms that can achieve good prediction performance for CSI in future time instances. This is a degree of freedom that was not yet addressed in the framework of standardized signaling and behavior, and requires a comprehensive framework in order to guarantee performance and avoid ambiguity between the UE and network.

The solution, in summary, is as follows (items 1-5 immediately following):

1) A UE may report a capability or an indication on its capability to compute predictions for all or a subset of CSI quantities. The UE may report such capability or indication upon network request or during connection establishment.

2) The gNB configures the UE with CSI reporting configurations in RRC, wherein at least one CSI reporting configuration includes CSI quantities for which prediction is configured/enabled. In the CSI reporting configuration, a prediction-dedicated format (e.g. prediction model feedback or multiple instances feedback) may be configured for a CSI quantity (e.g. model-based feedback).

3) For a CSI quantity for which CSI prediction is configured/enabled, the gNB configures or indicates in dynamic DL signaling (e.g., DCI, MAC CE is used to choose from a configured list of prediction windows) one or multiple prediction windows. A prediction window may indicate one or multiple time unit offsets with respect to the DL message (DCI or MAC CE) triggering/activating CSI reporting, or with respect to the timing of configured DL-RS resources, or with respect to time-frequency uplink resources used to transmit the CSI report containing the quantity. A "time unit" can be understood to be a slot, an OFDM symbol duration or any other time unit which is used in the system description.

If a prediction window indicates a single time unit offset, depending on a specified or configured rule, the time unit offset may be indicating one of the following (1-3): 1) An upper bound of the prediction time interval, which refers to the highest duration of the time unit offset for which the predicted CSI quantity should be valid, or the maximum duration of the offset for the output of a CSI prediction model. 2) A lower bound of the prediction time interval, which refers to the lowest duration of the time unit offset for which the predicted CSI quantity should be valid, or the minimum time duration of the offset for the output of a CSI prediction model. 3) The offset (measured in time units) to the time unit for which the CSI quantity should be computed, or the duration of the offset for the output of a prediction model.

If a prediction window indicates multiple time unit offsets, depending on a specified rule the multiple time unit offsets may be indicating one of the following (1-2): 1) Bounds of prediction intervals which may be lower and upper bounds of one or multiple prediction intervals. This indicates the time intervals (measured in time units) during which the predicted CSI quantity is expected to be valid or predicted CSI quantities are expected to be valid, or indicates the time interval (also measured in time units) for the output of a CSI prediction model. 2) The offsets (measured in time units) to the time units for which the CSI quantity should be computed or the time offsets for the output of a prediction model.

A prediction window may be linked/indicate the validity of AI generated model parameters used in the prediction procedures. Such model parameters may be transferred from the network to the UE. In a different embodiment, such model parameters may be valid longer, in time, than the signaled prediction window. In this case, the network would indicate both validity intervals, for the model parameters and for the prediction window. Such indication may be semi-statically and/or dynamically indicated. For example, the model parameter indication may be semi-static (e.g. in RRC configuration), and the prediction window duration may be dynamic. Combinations of these signaling ways are also possible.

4) Depending on the configuration, for a CSI quantity for which prediction is enabled/configured, the UE may be configured to feedback: i) Multiple instances of the same quantity predicted for multiple time unit offsets. ii) The coefficients of a CSI prediction model (e.g. the coefficients of a neural network, the coefficients of a regression polynomial function) which enable the gNB to compute a value or values of the CSI quantity at a time instance, in part given by the prediction window. iii) The amount of time sample instances used as input in the prediction model, with the understanding that there can be single or multiple time instances. Alternatively, the UE may indicate a time interval used as input for the prediction model.

5) In one variant the UE may select one prediction window or modify a configured or indicated prediction window or a plurality of prediction windows. In this case the UE reports a prediction window indicator or a prediction window shift indicator in uplink control information.

Prediction Windows: Formats, Configuration and Indication

There are several building blocks of the described solution: i) The amount of samples used as input for the prediction, known also as a measured samples interval. ii) The length of the output prediction, known also as a prediction window, measured in time units. iii) Possible restrictions applicable in/to the duration of a prediction window. iv) Implicit (or explicit) linkages between the amount of samples used as input for the prediction and the prediction window.

Measured Samples Interval

The CSI prediction done by the UE is based on measured samples. The amount of samples used by the prediction may depend on various conditions such as the system dynamics, e.g. if the network allocates a single measurement sample or multiple measurement samples, these depending also if the measurements are periodic (multiple measurements samples), aperiodic (single measurement sample), semi-persistent or with mixed time-domain behavior.

The gNB may configure to the UE the time window allowed to be used for the prediction. This is done because the gNB may configure various types of overlapping transmission where the interference profile impacts the measurements performed by the UE. For example, the measurements performed when the UE is sharing the same spatial resources with another UE (MU MIMO) may be different compared to when the UE is scheduled alone.

In addition, the gNB may trigger aperiodic or activate semi-persistent measurements, where the utilization of the previous sample might be (or might not be) allowed to the UE.

Prediction Window(s)

In the herein described scheme, for a CSI quantity for which CSI prediction is configured/enabled, the gNB configures or indicates in dynamic DL signaling (e.g., DCI, MAC CE is used to choose from a configured list of prediction windows) one prediction window or multiple prediction windows. It is also possible for the gNB to configure a UE with multiple prediction windows and perform dynamic subset selection of active prediction windows via downlink signaling (e.g., MAC CE).

A configured/indicated prediction window may be applicable for a single CSI quantity, a subset of configured CSI quantities or all configured CSI quantities. The applicability of a configured/indicated prediction window for a given CSI quantity may be indicated in the configuration, in dynamic DL signaling or in a specified rule.

A prediction window may indicate one time unit offset or multiple time unit offsets with respect to, the DL message (DCI or MAC CE) triggering/activating CSI reporting, or with respect to the timing of configured DL-RS resources, or with respect to time-frequency uplink resources used to transmit the CSI report containing the quantity.

If a prediction window indicates a single time unit offset, depending on a specified or configured rule, the time unit offset may be indicating one of the following (1-3): 1) An upper bound of the prediction time interval, which refers to the highest duration of the time unit offset for which the predicted CSI quantity should be valid, or the maximum duration of the offset for the output of a CSI prediction model. 2) A lower bound of the prediction time interval, which refers to the lowest duration of the time unit offset for which the predicted CSI quantity should be valid, or the minimum time duration of the offset for the output of a CSI prediction model. 3) The offset (measured in time units) to the time unit for which the CSI quantity should be computed, or the duration of the offset for the output of a prediction model.

If a prediction window indicates multiple time unit offsets, depending on a specified rule the multiple time unit offsets may be indicating one of the following (1-2): 1) Bounds of prediction intervals which may be lower and upper bounds of one or multiple prediction intervals. This indicates the time intervals (measured in time units) during which the predicted CSI quantity is expected to be valid or the predicted CSI quantities are expected to be valid, or indicates the time interval (also measured in time units) for the output of a CSI prediction model. 2) The offsets (measured in time units) to the time units for which the CSI quantity should be computed or the time offsets for the output of a prediction model.

Figure 2:
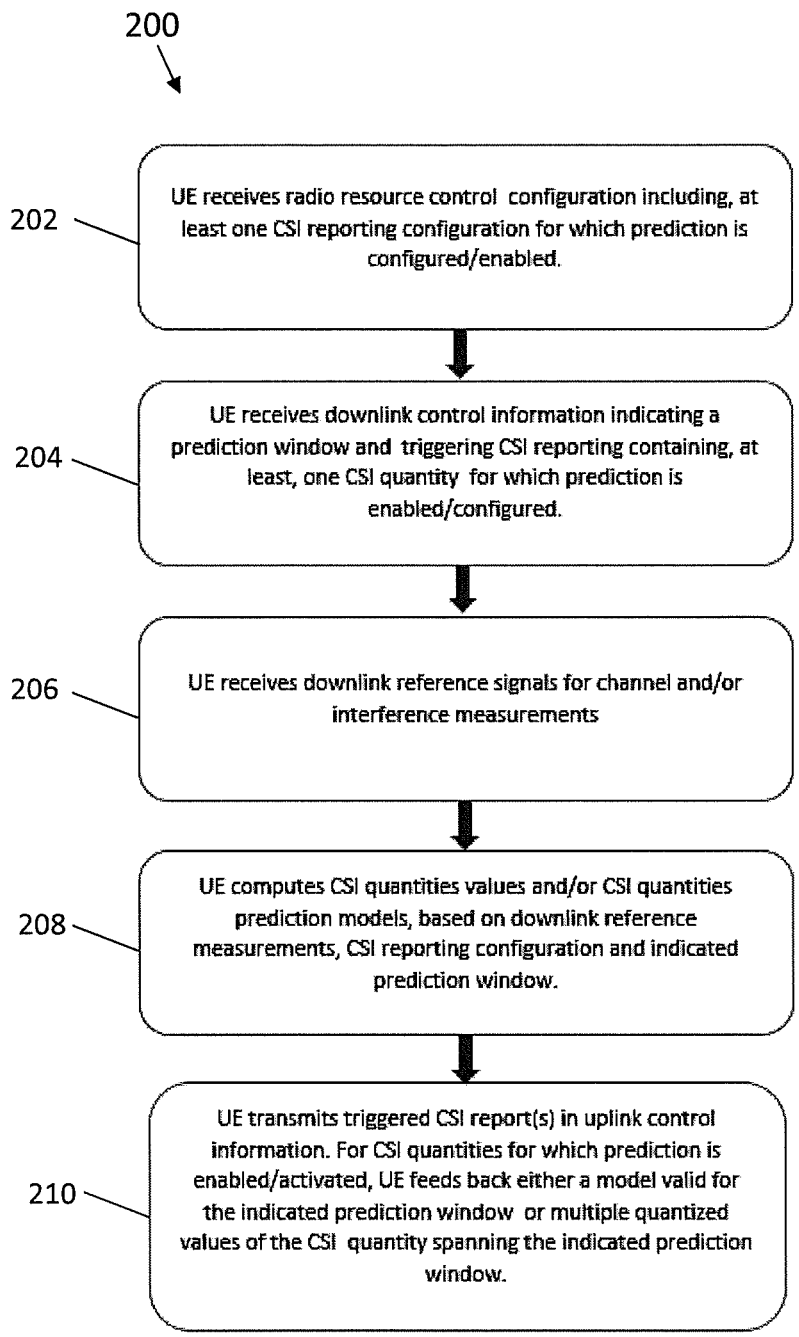
FIG. 2 shows a UE procedure with a dynamically indicated prediction window.

FIG. 2 shows a UE procedure 200 with a dynamically indicated prediction window. Method 200 may be performed by the UE 110 as shown in FIG. 1, and in part by the RAN node 170 and/or network element(s) 190 shown in FIG. 1. At 202, the UE receives a radio resource control configuration including at least one CSI reporting configuration for which prediction is configured/enabled. At 204, the UE receives downlink control information indicating a prediction window and triggering CSI reporting containing at least one CSI quantity for which prediction is enabled/configured. At 206, the UE receives downlink reference signals for channels and/or interference measurements. At 208, the UE computes CSI quantity values and/or CSI quantity prediction models, based on downlink reference measurements, the CSI reporting configuration and the indicated prediction window. At 210, the UE transmits the triggered one or more CSI reports in uplink control information. As further indicated at 210, for CSI quantities for which prediction is enabled/activated, the UE feeds back either a model valid for the indicated prediction window or multiple quantized values of the CSI quantity spanning the indicated prediction window.

Restrictions Applicable to Measurements and Prediction Windows

The radio channel and interference conditions seen by a UE may be impacted considerably in case of a scheduling restriction or a sudden change in UE speed (UE goes from pedestrian to car speed). In this case, both the previously learned prediction model and measured samples may become obsolete or, at least, less informative.

To address these situations, two approaches are described herein, namely 1) early learning termination and 2) measurement window restriction, which are not mutually exclusive.

Early learning termination. In case the gNB detects a considerable change in the UE channel conditions, e.g. based on SRS, DMRS or TRS, the gNB may instruct the UE, via dynamic downlink signaling, to terminate its learning process. Depending on a specified rule, the UE may reset its model to learn from scratch based on new samples, fallback to conventional CSI operation without prediction until receiving a prediction reactivation command from the network, or adapt its learning rate autonomously or based on an indicated rate or rate offset from the network.

Measurement window restriction. In this case the network indicates a restriction on the samples used for CSI prediction. This restriction may be in the form of a time unit offset indicated in dynamic downlink signaling. The time unit offset may indicate an offset with respect to the DL message (DCI or MAC CE) conveying measurement restrictions, with respect to the timing of configured DL-RS resources, or with respect to time-frequency uplink resources used to transmit the CSI report containing the quantity. The UE may understand the measurement restriction command to be indicating the offset to the oldest samples that would be considered during CSI prediction.

Signaling Linkages

The quality of the prediction is linked with the amount of samples used as input. The system operates both with one shot measurements but also with multiple time/frequency/space samples. The UE may be implicitly indicating the prediction strategies based on the amount of samples used for measurement. A single shot measurement may be used for an instantaneous computation or for a very short prediction duration. Multiple time samples may be used for more accurate prediction. The above prediction durations may be implicitly known by the UE.

In situations where the prediction quality decreases, at least two remedies are possible. One remedy is for the UE to indicate to the gNB and trigger additional transmission of measurement samples. A second remedy is to maintain the same number of measurement samples while decreasing the duration of the prediction window.

UE-Centric Prediction Windows

The UE has a better knowledge of the measured channel and interference conditions and is performing computations to derive CSI prediction models. Consequently, leveraging UE-side information to optimize the prediction window for CSI quantities can provide many advantages.

For example, the UE 110 may shift all or bounds of prediction windows based on its movement velocity. Additionally, the UE may select one prediction window out of a set of configured/indicated prediction windows, based on its perspective of the channel conditions.

Figure 3:
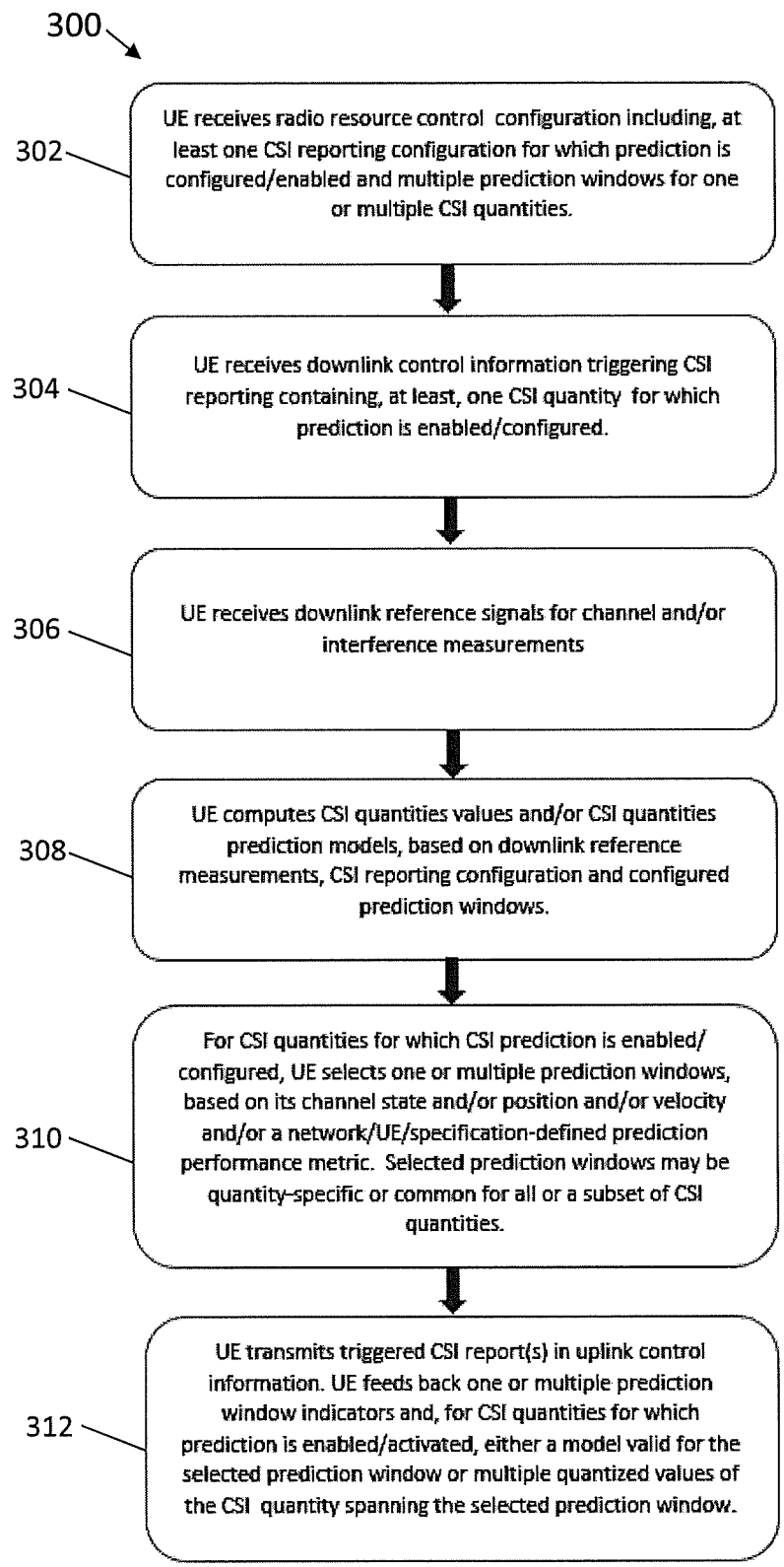
FIG. 3 shows a UE procedure with UE-centric prediction window selection.

FIG. 3 shows a UE procedure 300 with UE-centric prediction window selection. Method 300 may be performed by the UE 110 as shown in FIG. 1, and in part by the RAN node 170 and/or network element(s) 190 shown in FIG. 1. At 302, the UE receives a radio resource control configuration including at least one CSI reporting configuration for which prediction is configured/enabled and multiple prediction windows for one or multiple CSI quantities. At 304, the UE receives downlink control information triggering CSI reporting containing, at least, one CSI quantity for which prediction is enabled/configured. At 306, the UE receives downlink reference signals for a channel and/or interference measurements. At 308, the UE computes CSI quantity values and/or CSI quantity prediction models, based on downlink reference measurements, the CSI reporting configuration and configured prediction windows. At 310, for CSI quantities for which CSI prediction is enabled/configured, the UE selects one or multiple prediction windows, based on its channel state and/or position and/or velocity and/or a network/UE/specification-defined prediction performance metric. As further described at 310, selected prediction windows may be quantity-specific or common for all or a subset of CSI quantities. At 312, the UE transmits triggered CSI report(s) in uplink control information. As further indicated at 312, the UE feeds back one or multiple prediction window indicators and, for CSI quantities for which prediction is enabled/activated, either a model valid for the selected prediction window or multiple quantized values of the CSI quantity spanning the selected prediction window.

Figure 4:
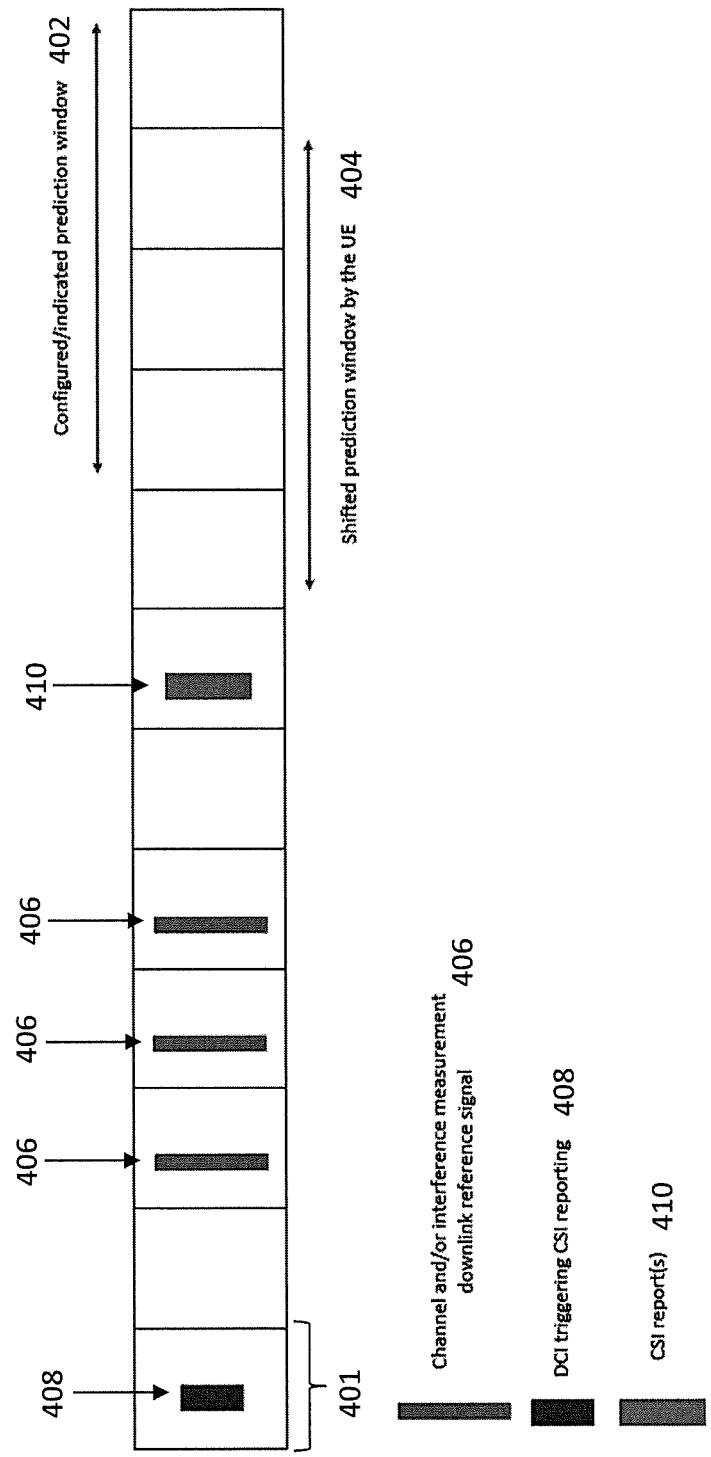
FIG. 4 is an illustration of a scheme wherein the UE is configured to shift a configured/indicated prediction window.

FIG. 4 is an illustration of the described scheme wherein the UE is able to shift the configured/indicated prediction window. Shown in FIG. 4 are a plurality of prediction windows 401. Twelve such prediction windows 401 are shown in FIG. 4. As shown in FIG. 4, the prediction windows may be configured/indicated (402), or the prediction windows may be shifted by the UE (404). Shown in FIG. 4 is the prediction window where the UE (such as UE 110 of FIG. 1) receives DCI triggering CSI reporting (408), the prediction windows where the UE receives downlink reference signals for a channel and/or interference measurement (406), and the prediction window where the UE transmits a CSI report or a plurality of CSI reports (410).

Figure 5:
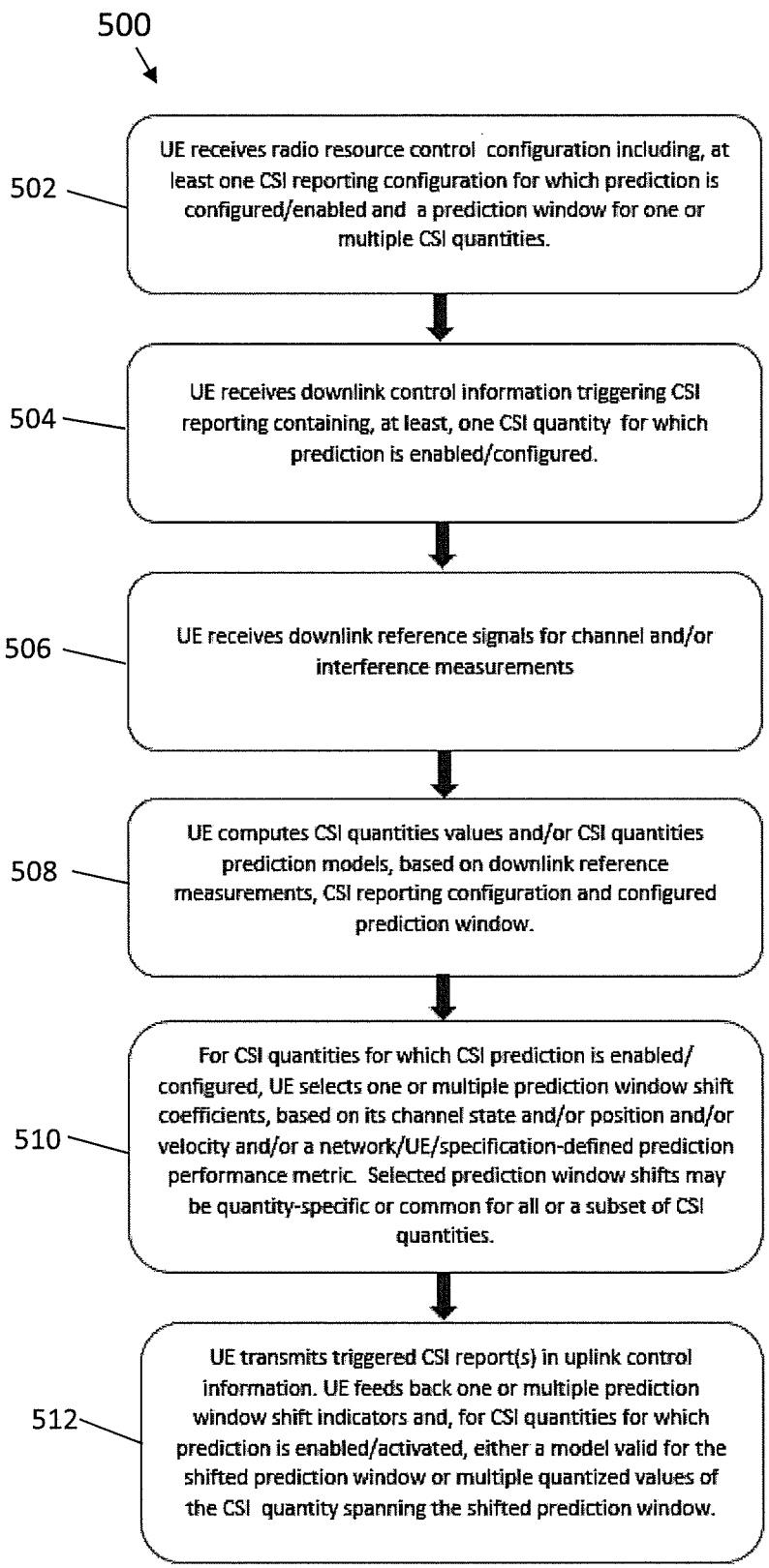
FIG. 5 shows a UE procedure wherein the UE is configured to shift a configured/indicated prediction window.

FIG. 5 illustrates a UE procedure 500 wherein the UE is enabled to shift the configured/indicated prediction window. Method 500 may be performed by the UE 110 as shown in FIG. 1, and in part by the RAN node 170 and/or network element(s) 190 shown in FIG. 1. At 502, the UE receives a radio resource control configuration including at least one CSI reporting configuration for which prediction is configured/enabled and a prediction window for one or multiple CSI quantities. At 504, the UE receives downlink control information triggering CSI reporting containing, at least, one CSI quantity for which prediction is enabled/configured. At 506, the UE receives downlink reference signals for channel and/or interference measurements. At 508, the UE computes CSI quantity values and/or CSI quantity prediction models, based on downlink reference measurements, the CSI reporting configuration and the configured prediction window. At 510, for CSI quantities for which CSI prediction is enabled/configured, the UE selects one or multiple prediction window shift coefficients, based on its channel state and/or position and/or velocity and/or a network/UE/specification-defined prediction performance metric. As further indicated at 510, the selected prediction window shifts may be quantity-specific or common for all or a subset of CSI quantities. At 512, the UE transmits one triggered CSI report or a plurality of CSI reports in uplink control information. As further indicated at 512, the UE feeds back one or multiple prediction window shift indicators and, for CSI quantities for which prediction is enabled/activated, either a model valid for the shifted prediction window or multiple quantized values of the CSI quantity spanning the shifted prediction window.

In FIG. 2, FIG. 3, and FIG. 5, in some examples, the receipt of the downlink control information triggering channel state information reporting containing the at least one channel state information quantity for which prediction is configured or enabled is specific for aperiodic CSI reporting. In some examples, for semi-persistent and periodic reporting, DCI is not used (where DCI is used only for aperiodic and semi-persistent on PUSCH). Also, receipt of a downlink channel for at least one channel and/or interference measurement is related to the case where the decoding state and data are used instead the CSI-RS or SSB.

Practical Embodiment and Simulation Results

A practical example for the described examples is provided herein, wherein prediction is enabled for frequency selective CQI.

In the considered example, it is assumed that the network enables prediction of CQI per sub-band with a prediction window of 4 subframes. The prediction window is configured with respect to time-frequency uplink resources used to transmit the CSI report.

The UE computes a prediction model based on multiple CSI-RS measurements. The number of CSI-RS measurements considered during training are lower bounded by 10.

In this example, it is assumed that the UE is using a gradient boost regressor which gives a prediction of CQI for a given sub-band, for the next 4 subframes given an input of 3 previous CQI estimates (2 subframes between each estimate) for the same subband.

The simulation evaluation methodology (EVM) is as shown in Table 1.

TABLE 1

| Parameter | Value |
| --- | --- |
| Scenario | Dense Urban (Macro only) |
| Frequency Range | 4 GHz |
| Inter-BS distance | 500 m |
| Antenna setup and port layouts at gNB | 32 ports: (8, 8, 2, 1, 1, 2, 8), (dH, dV) = (0.5, 0.8)$\lambda$ |
| Antenna setup and port layouts at UE | 2RX: (1, 1, 2, 1, 1, 1, 1), (dH, dV) = (0.5, 0.5)$\lambda$ for (rank 1, 2) |
| BS Tx power | 44 dBm for 20 MHz |
| Simulation bandwidth | 20 MHz for 15 kHz |
| Traffic model | FTP model 1 with packet size 0.5 Mbytes |
| UE distribution | 80% indoor (3 km/h), 20% outdoor (30 km/h) |
| UE receiver | MMSE-IRC as the baseline receiver |
| Feedback assumption | Realistic |
| Channel estimation | Realistic |
| CQI feedback format | Frequency selective |
| CSI-RS period | 2 ms |
| PMI codebook | Rel-16 eType II port selection |

Figure 6:
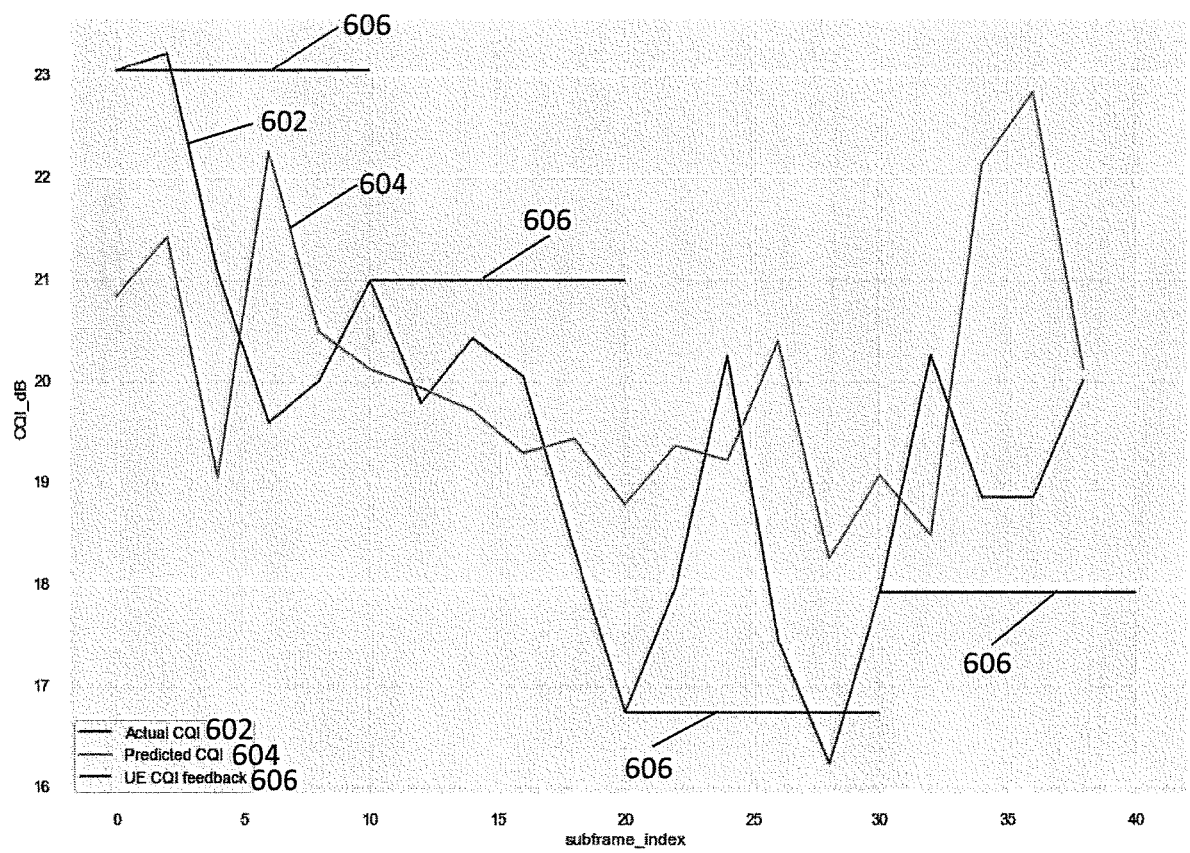
FIG. 6 demonstrates UE prediction based on a gradient boost regressor.

As can be seen in FIG. 6, CQI prediction can provide non-negligible improvement for link adaptation. The line labeled 602 is the actual CQI, and the line labeled 604 is the predicted CQI. For the same CSI-RS overhead, CQI prediction model feedback enables finer time resolution of CQI feedback when compared to the current CSI reporting framework. Additionally, CQI prediction model feedback enables reduction of the mismatch between actual CQI and used CQI for link adaptation, which arises from CSI delay.

It is critical for the gNB 170 and UE 110 to have the same understanding of the prediction window used at the UE-side. Indeed, this conditions the usage of the model and its outputs at the network side. As can be seen from FIG. 6, any time mismatch could result in very different prediction which would ultimately penalize link adaptation.

In FIG. 6, the lines marked 606 with the label UE CQI feedback, represent the available CQI knowledge at the network side following CQI feedback of periodicity 10 subframes, without considering outer-loop link adaptation.

The network may use both CQI feedback and CQI model feedback in order to obtain a higher time granularity for the CQI without increasing its reporting periodicity.

The methods described herein may be contributed to Rel-18 3GPP, as they represent a comprehensive framework to configure and handle CSI prediction which is expected to be one of the main items in machine learning enablers for RAN and beamformed access (Rel-18+). The usage of the methods described herein may be regulated by standardization. The examples described herein, including their technical effects, entail novel configuration, UE behavior, new dynamic downlink signaling, and in some embodiments, new CSI UE reporting.

Figure 7:
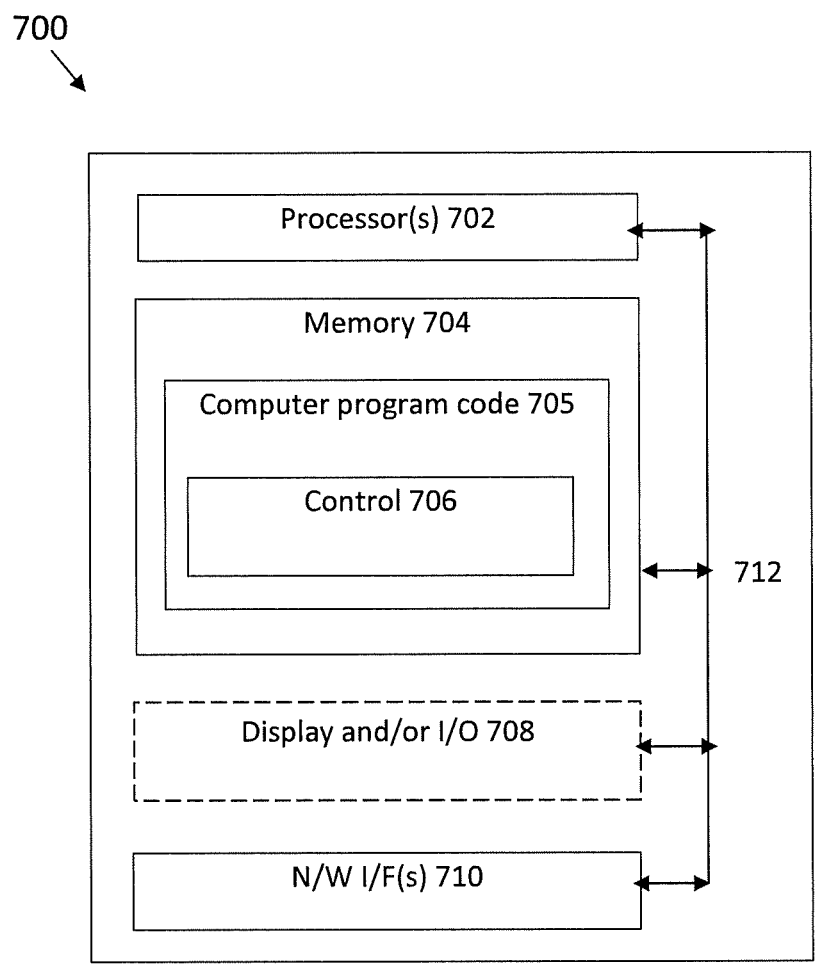
FIG. 7 is an example apparatus configured to implement CSI prediction configuration and control, based on the examples described herein.

FIG. 7 is an example apparatus 700, which may be implemented in hardware, configured to implement the examples described herein. The apparatus 700 comprises at least one processor 702 (an FPGA and/or CPU), at least one non-transitory or transitory memory 704 including computer program code 705, wherein the at least one memory 704 and the computer program code 705 are configured to, with the at least one processor 702, cause the apparatus 700 to implement circuitry, a process, component, module, or function (collectively control 706) to implement CSI prediction configuration and control.

The apparatus 700 optionally includes a display and/or I/O interface 708 that may be used to display aspects or a status of the methods described herein (e.g., as one of the methods is being performed or at a subsequent time). The apparatus 700 includes one or more network (N/W) interfaces (I/F(s)) 710. The N/W I/F(s) 710 may be wired and/or wireless and communicate over the Internet/other network(s) via any communication technique. The N/W I/F(s) 710 may comprise one or more transmitters and one or more receivers. The N/W I/F(s) 710 may comprise standard well-known components such as an amplifier, filter, frequency-converter, (de)modulator, and encoder/decoder circuitries and one or more antennas.

The apparatus 700 to implement the functionality of control 706 may be UE 110, RAN node 170, or network element(s) 190. Thus, processor 702 may correspond respectively to processor(s) 120, processor(s) 152 and/or processor(s) 175, memory 704 may correspond respectively to memory(ies) 125, memory(ies) 155 and/or memory(ies) 171, computer program code 705 may correspond respectively to computer program code 123, module 140-1, module 140-2, and/or computer program code 153, module 150-1, module 150-2, and/or computer program code 173, and N/W I/F(s) 710 may correspond respectively to N/W I/F(s) 161 and/or N/W I/F(s) 180. Alternatively, apparatus 700 may not correspond to either of UE 110, RAN node 170, or network element(s) 190, as apparatus 700 may be part of a self-organizing/optimizing network (SON) node, such as in a cloud. The apparatus 700 may also be distributed throughout the network 100 including within and between apparatus 700 and any one of the network element(s) (190) (such as a network control element (NCE)) and/or the RAN node 170 and/or the UE 110.

Interface 712 enables data communication between the various items of apparatus 700, as shown in FIG. 7. For example, the interface 712 may be one or more buses such as address, data, or control buses, and may include any interconnection mechanism, such as a series of lines on a motherboard or integrated circuit, fiber optics or other optical communication equipment, and the like. Computer program code 705, including control 706 may comprise object-oriented software configured to pass data/messages between objects within computer program code 705. The apparatus 700 need not comprise each of the features mentioned, or may comprise other features as well.

Figure 8:
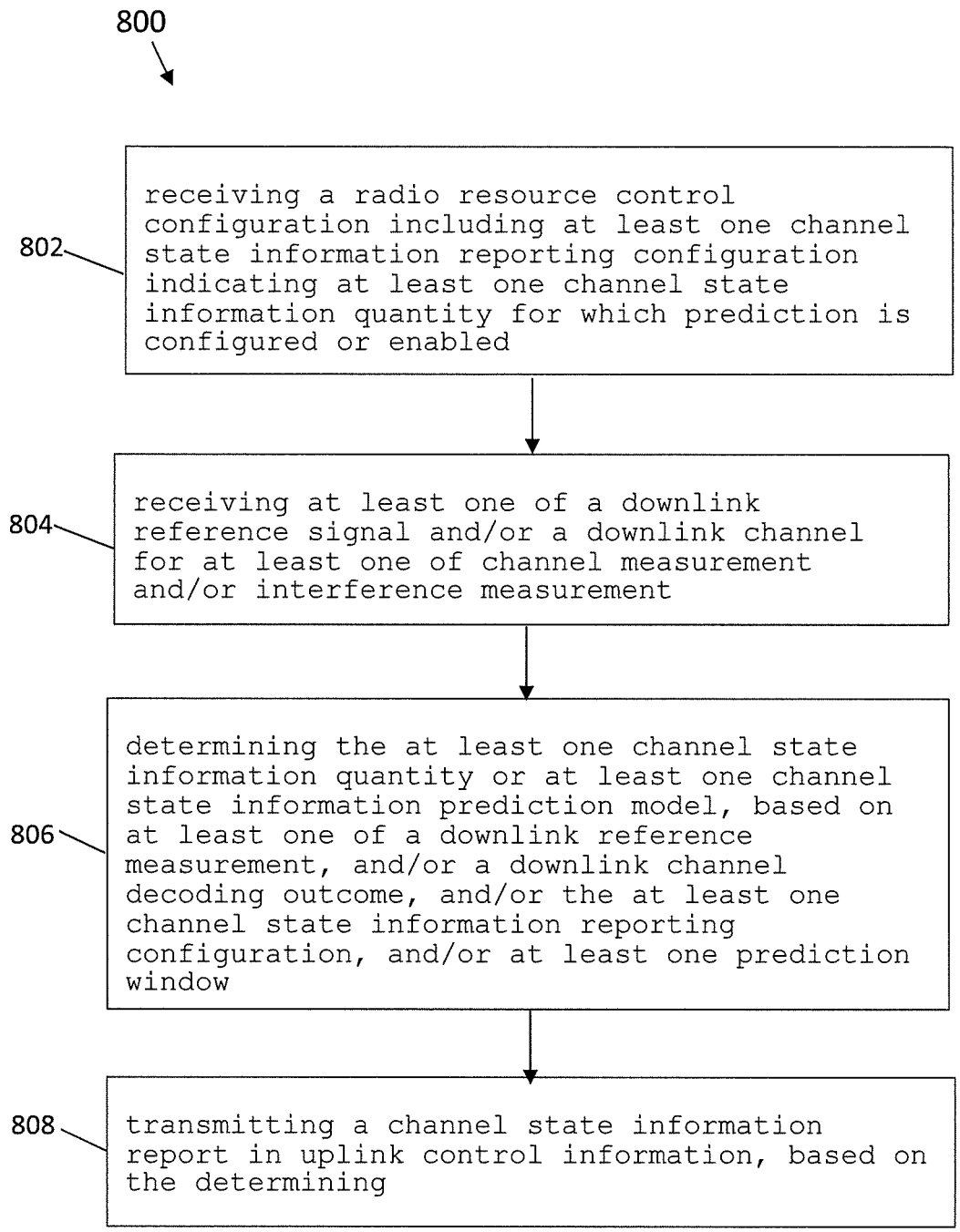
FIG. 8 is another example method to implement CSI prediction configuration and control, based on the examples described herein.

FIG. 8 is an example method 800 to implement CSI prediction configuration and control, based on the example embodiments described herein. At 802, the method includes receiving a radio resource control configuration including at least one channel state information reporting configuration indicating at least one channel state information quantity for which prediction is configured or enabled. At 804, the method includes receiving at least one of a downlink reference signal and/or a downlink channel for at least one of channel measurement and/or interference measurement. At 806, the method includes determining the at least one channel state information quantity or at least one channel state information prediction model, based on at least one of a downlink reference measurement, and/or a downlink channel decoding outcome, and/or the at least one channel state information reporting configuration, and/or at least one prediction window. At 808, the method includes transmitting a channel state information report in uplink control information, based on the determining. Method 800 may be performed with UE 110, apparatus 700, or a combination of those.

Figure 9:
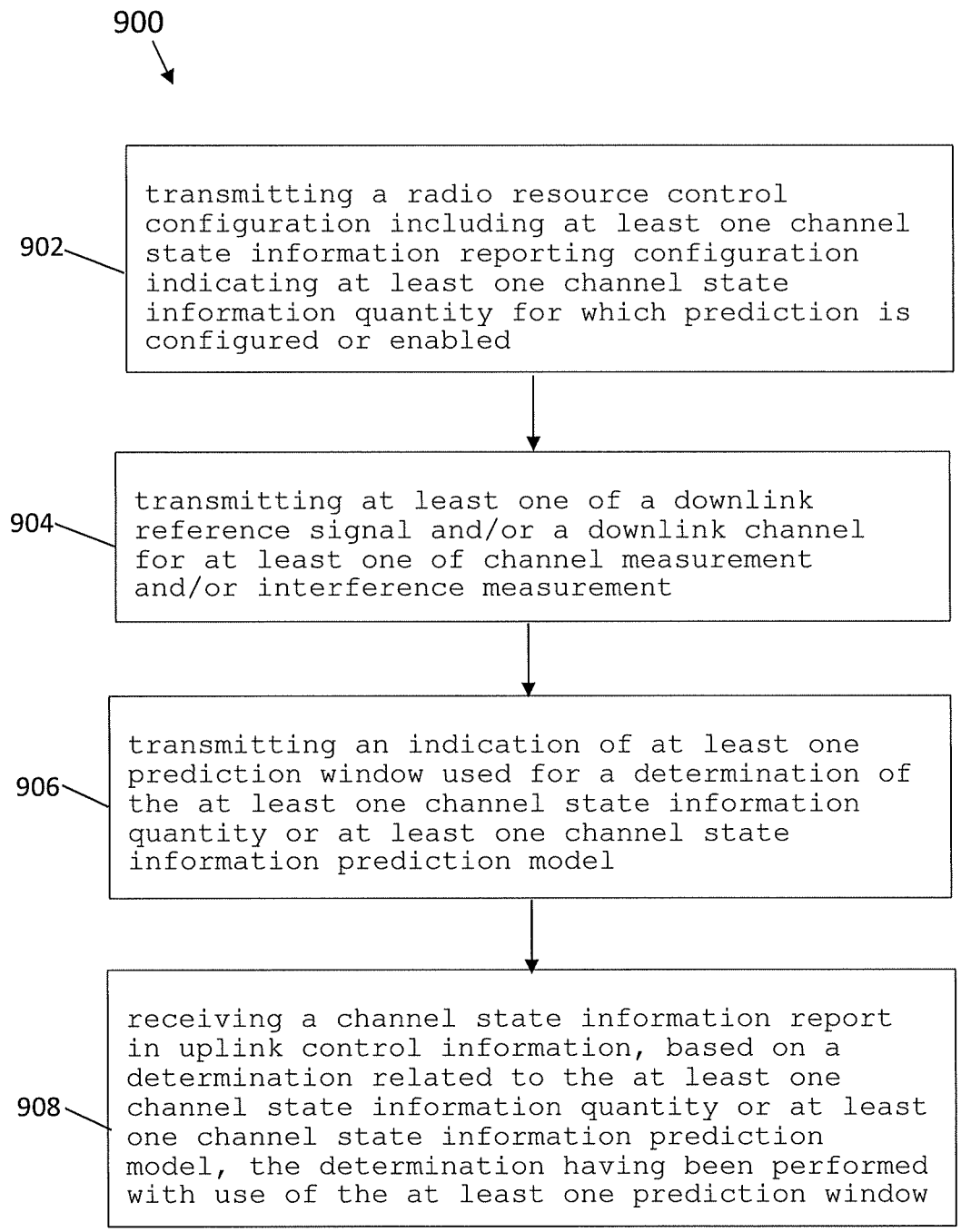
FIG. 9 is another example method to implement CSI prediction configuration and control, based on the examples described herein.

FIG. 9 is an example method 900 to implement CSI prediction configuration and control, based on the example embodiments described herein. At 902, the method includes transmitting a radio resource control configuration including at least one channel state information reporting configuration indicating at least one channel state information quantity for which prediction is configured or enabled. At 904, the method includes transmitting at least one of a downlink reference signal and/or a downlink channel for at least one of channel measurement and/or interference measurement. At 906, the method includes transmitting an indication of at least one prediction window used for a determination of the at least one channel state information quantity or at least one channel state information prediction model. At 908, the method includes receiving a channel state information report in uplink control information, based on a determination related to the at least one channel state information quantity or at least one channel state information prediction model, the determination having been performed with use of the at least one prediction window. Method 900 may be performed with gNB 170, apparatus 700, or a combination of those.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory(ies) as described herein may be implemented using any suitable data storage technology, such as semiconductor based memory devices, flash memory, magnetic memory devices and systems, optical memory devices and systems, non-transitory memory, transitory memory, fixed memory and removable memory. The memory(ies) may comprise a database for storing data.

As used herein, the term 'circuitry' may refer to the following: (a) hardware circuit implementations, such as implementations in analog and/or digital circuitry, and (b)

combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An example apparatus includes at least one processor; and at least one non-transitory memory including computer program code; wherein the at least one memory and the computer program code are configured to, with the at least one processor, cause the apparatus at least to: receive a radio resource control configuration including at least one channel state information reporting configuration indicating at least one channel state information quantity for which prediction is configured or enabled; receive at least one of a downlink reference signal and/or a downlink channel for at least one of channel measurement and/or interference measurement; determine the at least one channel state information quantity or at least one channel state information prediction model, based on at least one of a downlink reference measurement, and/or a downlink channel decoding outcome, and/or the at least one channel state information reporting configuration, and/or at least one prediction window; and transmit a channel state information report in uplink control information, based on the determining.

The apparatus may further include wherein the at least one memory and the computer program code are further configured to, with the at least one processor, cause the apparatus at least to: receive downlink control information triggering channel state information reporting containing the at least one channel state information quantity for which prediction is configured or enabled; and wherein the downlink control information indicates the at least one prediction window or one prediction window from a list of configured prediction windows.

The apparatus may further include wherein the radio resource control configuration configures the at least one prediction window.

The apparatus may further include wherein the at least one memory and the computer program code are further configured to, with the at least one processor, cause the apparatus at least to: feed back, for the at least one channel state information quantity for which prediction is configured or enabled, either a model valid for the at least one prediction window, or multiple quantized values of the at least one channel state information quantity spanning the at least one prediction window.

The apparatus may further include wherein the at least one memory and the computer program code are further configured to, with the at least one processor, cause the apparatus at least to: select, for the at least one channel state information quantity for which prediction is configured or enabled, the at least one prediction window from multiple configured prediction windows; feed back at least one prediction window indicator; and feed back, for the at least one channel state information quantity for which prediction is configured or enabled, either a model valid for the selected at least one prediction window or multiple quantized values of the at least one channel state information quantity spanning the selected at least one prediction window.

The apparatus may further include wherein the at least one prediction window is selected based on at least one of: a channel state; a user equipment position; a user equipment velocity; a network defined measurement interval or count; or a network, user equipment, or specification-defined prediction performance metric.

The apparatus may further include wherein the selected at least one prediction window is quantity-specific or common for channel state information quantities or a subset of the channel state information quantities.

The apparatus may further include wherein the at least one memory and the computer program code are further configured to, with the at least one processor, cause the apparatus at least to: select, for the at least one channel state information quantity for which prediction is configured or enabled, at least one shift coefficient to shift the at least one prediction window forward or backward in time; wherein the selected shift for the at least one prediction window is quantity-specific or common for channel state information quantities or a subset of the channel state information quantities.

The apparatus may further include wherein the at least one shift coefficient is selected based on at least one of: a user equipment channel state; a user equipment position; a user equipment velocity; a network defined measurement interval or count; or a network, user equipment, or specification-defined prediction performance metric.

The apparatus may further include wherein the at least one memory and the computer program code are further configured to, with the at least one processor, cause the apparatus at least to: feed back at least one prediction window shift indicator; and feed back, for the at least one channel state information quantity for which prediction is configured or enabled, either a model valid for the shifted at least one prediction window or multiple quantized values of the at least one channel state information quantity spanning the shifted at least one prediction window.

The apparatus may further include wherein the transmission of the channel state information report is either: aperiodic in response to receiving downlink control information triggering channel state information reporting containing the at least one channel state information quantity for which prediction is configured or enabled; or periodic or semi-persistent in response to receiving the at least one downlink reference signal and/or the downlink channel for the at least one channel and/or interference measurement.

An example apparatus includes at least one processor; and at least one non-transitory memory including computer program code; wherein the at least one memory and the computer program code are configured to, with the at least one processor, cause the apparatus at least to: transmit a radio resource control configuration including at least one channel state information reporting configuration indicating at least one channel state information quantity for which prediction is configured or enabled; transmit at least one of a downlink reference signal and/or a downlink channel for at least one of channel measurement and/or interference measurement; transmitting an indication of at least one prediction window used for a determination of the at least one channel state information quantity or at least one channel state information prediction model; and receive a channel state information report in uplink control information, based on a determination related to the at least one channel state information quantity or at least one channel state information prediction model, the determination having been performed with use of the at least one prediction window.

The apparatus may further include wherein the at least one memory and the computer program code are further configured to, with the at least one processor, cause the apparatus at least to: transmit downlink control information triggering channel state information reporting containing the at least one channel state information quantity for which prediction is configured or enabled; and wherein the downlink control information indicates the at least one prediction window or one prediction window from a list of configured prediction windows.

The apparatus may further include wherein the radio resource control configuration configures the at least one prediction window.

The apparatus may further include wherein the at least one memory and the computer program code are further configured to, with the at least one processor, cause the apparatus at least to: receive, for the at least one channel state information quantity for which prediction is configured or enabled, either a model valid for the at least one prediction window, or multiple quantized values of the at least one channel state information quantity spanning the at least one prediction window.

The apparatus may further include wherein the at least one memory and the computer program code are further configured to, with the at least one processor, cause the apparatus at least to: receive at least one prediction window indicator; and receive, for the at least one channel state information quantity for which prediction is configured or enabled, either a model valid for a selected at least one prediction window or multiple quantized values of the at least one channel state information quantity spanning the selected at least one prediction window.

The apparatus may further include wherein the at least one memory and the computer program code are further configured to, with the at least one processor, cause the apparatus at least to: receive at least one prediction window shift indicator; and receive, for the at least one channel state information quantity for which prediction is configured or enabled, either a model valid for a shifted at least one prediction window or multiple quantized values of the at least one channel state information quantity spanning the shifted at least one prediction window.

The apparatus may further include wherein the receiving of the channel state information report is either: aperiodic in response to transmitting downlink control information triggering channel state information reporting containing the at least one channel state information quantity for which prediction is configured or enabled; or periodic or semi-persistent in response to transmitting the at least one downlink reference signal and/or the downlink channel for the at least one channel and/or interference measurement.

An example method includes receiving a radio resource control configuration including at least one channel state information reporting configuration indicating at least one channel state information quantity for which prediction is configured or enabled; receiving at least one of a downlink reference signal and/or a downlink channel for at least one of channel measurement and/or interference measurement; determining the at least one channel state information quantity or at least one channel state information prediction model, based on at least one of a downlink reference measurement, and/or a downlink channel decoding outcome, and/or the at least one channel state information reporting configuration, and/or at least one prediction window; and transmitting a channel state information report in uplink control information, based on the determining.

The method may further include selecting, for the at least one channel state information quantity for which prediction is configured or enabled, the at least one prediction window from multiple configured prediction windows; or selecting, for the at least one channel state information quantity for which prediction is configured or enabled, at least one shift coefficient to shift the at least one prediction window forward or backward in time.

The method may further include feeding back at least one prediction window indicator; or feeding back at least one prediction window shift indicator.

An example non-transitory program storage device readable with a machine, tangibly embodying a program of instructions executable with the machine for performing operations is provided, the operations comprising: receiving a radio resource control configuration including at least one channel state information reporting configuration indicating at least one channel state information quantity for which prediction is configured or enabled; receiving at least one of a downlink reference signal and/or a downlink channel for at least one of channel measurement and/or interference measurement; determining the at least one channel state information quantity or at least one channel state information prediction model, based on at least one of a downlink reference measurement, and/or a downlink channel decoding outcome, and/or the at least one channel state information reporting configuration, and/or at least one prediction window; and transmitting a channel state information report in uplink control information, based on the determining.

The operations of the non-transitory program storage may further include: selecting, for the at least one channel state information quantity for which prediction is configured or enabled, the at least one prediction window from multiple configured prediction windows; or selecting, for the at least one channel state information quantity for which prediction is configured or enabled, at least one shift coefficient to shift the at least one prediction window forward or backward in time.

The operations of the non-transitory program storage may further include: feeding back at least one prediction window indicator; or feeding back at least one prediction window shift indicator.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, this description is intended to embrace all such alternatives, modifications and variances which fall within the scope of the appended claims.

The following acronyms and abbreviations that may be found in the specification and/or the drawing figures are defined as follows:

3GPP third generation partnership project
4G fourth generation
5G fifth generation
5GC 5G core network
AI artificial intelligence
AMF access and mobility management function
ASIC application-specific integrated circuit
BS base station (e.g., inter-BS)
CE control element CPU central processing unit
CQI channel quality indicator
CRI CSI-RS resource indicator
CSI channel state information
CSI-IM channel state information interference measurement
CSI-RS channel state information reference signal
CU central unit or centralized unit
DCI downlink control information
DL downlink
DL-RS downlink reference signal
DMRS demodulation reference signal
DSP digital signal processor
DU distributed unit
eNB evolved Node B (e.g., an LTE base station)
EN-DC E-UTRA-NR dual connectivity
en-gNB node providing NR user plane and control plane protocol terminations towards the UE, and acting as a secondary node in EN-DC
eType evaluating type
E-UTRA evolved universal terrestrial radio access, i.e., the LTE radio access technology
EVM evaluation methodology
F1 control interface between the CU and the DU
FPGA field-programmable gate array
FTP file transfer protocol
gNB base station for 5G/NR, i.e., a node providing NR user plane and control plane protocol terminations towards the UE, and connected via the NG interface to the 5GC
I/F interface
I/O input/output
L1-RSRP layer-1 reference signal received power
L1-SINR layer-1 signal to noise or interference ratio
L1 length indicator
LMF location management function
LTE long term evolution (4G)
MAC medium access control
MIMO multiple input, multiple output
ML machine learning
MME mobility management entity
MMSE-IRC minimum mean square error interference rejection combining
MU multi-user
NCE network control element
ng or NG new generation
ng-eNB new generation eNB
NG-RAN new generation radio access network
NR new radio (5G)
N/W network
NZP non-zero-power
OFDM orthogonal frequency-division multiplexing
PBCH physical broadcast channel
PDA personal digital assistant
PDCP packet data convergence protocol
PDSCH physical downlink shared channel
PHY physical layer
PMI precoding matrix indicator
RAN radio access network
Rel-release
RF radio frequency
RI rank indication/indicator
RLC radio link control
RRC radio resource control (protocol)
RRH remote radio head
RU radio unit
Rx or RX receiver or reception
SGW serving gateway
SON self-organizing/optimizing network
SRS sounding reference signal
SS synchronization signal
SSB synchronization signal block, or SS/PBCH
SSBRI SS/PBCH resource block indicator
TRP transmission and/or reception point
TRS tracking reference signal
TS technical specification
Tx or TX transmitter or transmission
UE user equipment (e.g., a wireless, typically mobile device)
UPF user plane function
X2 network interface between RAN nodes and between RAN and the core network
Xn network interface between NG-RAN nodes

What is claimed is:

1. An apparatus comprising:
at least one processor; and
at least one non-transitory memory storing instructions that, when executed by the at least one processor, cause the apparatus at least to:
receive a radio resource control configuration including at least one channel state information reporting configuration indicating at least one channel state information quantity for which prediction is configured or enabled;
receive a downlink reference signal for interference measurement, or receive a downlink channel for at least one of: channel measurement, or interference measurement;
perform at least one of the following:
  determine the at least one channel state information quantity, based on at least one of: a downlink channel decoding outcome, or at least one prediction window, or
  determine a channel state information prediction model, based on at least one of: a downlink reference measurement, or a downlink channel decoding outcome, or the at least one channel state information reporting configuration, or the at least one prediction window;
transmit a channel state information report in uplink control information, based on the determining;
select, for the at least one channel state information quantity for which prediction is configured or enabled, at least one shift coefficient to shift the at least one prediction window forward or backward in time; and
wherein the selected shift for the at least one prediction window is quantity-specific or common for channel state information quantities or a subset of the channel state information quantities.

2. The apparatus of claim 1, wherein the instructions, when executed by the at least one processor, cause the apparatus at least to:
receive downlink control information triggering channel state information reporting containing the at least one channel state information quantity for which prediction is configured or enabled; and
wherein the downlink control information indicates the at least one prediction window or one prediction window from a list of configured prediction windows.

3. The apparatus of claim 1, wherein the radio resource control configuration configures the at least one prediction window.

4. The apparatus of claim 1, wherein the instructions, when executed by the at least one processor, cause the apparatus at least to:

feed back, for the at least one channel state information quantity for which prediction is configured or enabled, either a model valid for the at least one prediction window, or multiple quantized values of the at least one channel state information quantity spanning the at least one prediction window.

5. The apparatus of claim 1, wherein the instructions, when executed by the at least one processor, cause the apparatus at least to:
select, for the at least one channel state information quantity for which prediction is configured or enabled, the at least one prediction window from multiple configured prediction windows;
feed back at least one prediction window indicator; and
feed back, for the at least one channel state information quantity for which prediction is configured or enabled, either a model valid for the selected at least one prediction window or multiple quantized values of the at least one channel state information quantity spanning the selected at least one prediction window.

6. The apparatus of claim 5, wherein the at least one prediction window is selected based on at least one of:
a channel state;
a user equipment position;
a user equipment velocity;
a network defined measurement interval or count; or
a network, user equipment, or specification-defined prediction performance metric.

7. The apparatus of claim 5, wherein the selected at least one prediction window is quantity-specific or common for channel state information quantities or a subset of the channel state information quantities.

8. The apparatus of claim 1, wherein the at least one shift coefficient is selected based on at least one of:
a user equipment channel state;
a user equipment position;
a user equipment velocity;
a network defined measurement interval or count; or
a network, user equipment, or specification-defined prediction performance metric.

9. The apparatus of claim 1, wherein the instructions, when executed by the at least one processor, cause the apparatus at least to:
feed back at least one prediction window shift indicator; and
feed back, for the at least one channel state information quantity for which prediction is configured or enabled, either a model valid for the shifted at least one prediction window or multiple quantized values of the at least one channel state information quantity spanning the shifted at least one prediction window.

10. The apparatus of claim 1, wherein the transmission of the channel state information report is either:
aperiodic in response to receiving downlink control information triggering channel state information reporting containing the at least one channel state information quantity for which prediction is configured or enabled; or
periodic or semi-persistent in response to receiving the at least one downlink reference signal and/or the downlink channel for the at least one channel and/or interference measurement.

11. An apparatus comprising:
at least one processor; and
at least one non-transitory memory storing instructions that, when executed by the at least one processor, cause the apparatus at least to:
transmit a radio resource control configuration including at least one channel state information reporting configuration indicating at least one channel state information quantity for which prediction is configured or enabled;
transmit a downlink reference signal for interference measurement, or transmit a downlink channel for at least one of: channel measurement, or interference measurement;
transmit an indication of at least one prediction window used for a determination of the at least one channel state information quantity or at least one channel state information prediction model;
receive a channel state information report in uplink control information, based on a determination related to the at least one channel state information quantity or at least one channel state information prediction model, the determination having been performed with use of the at least one prediction window;
receive at least one prediction window indicator; and
receive, for the at least one channel state information quantity for which prediction is configured or enabled, either a model valid for a selected at least one prediction window or multiple quantized values of the at least one channel state information quantity spanning the selected at least one prediction window.

12. The apparatus of claim 11, wherein the instructions, when executed by the at least one processor, cause the apparatus at least to:
transmit downlink control information triggering channel state information reporting containing the at least one channel state information quantity for which prediction is configured or enabled; and
wherein the downlink control information indicates the at least one prediction window or one prediction window from a list of configured prediction windows.

13. The apparatus of claim 11, wherein the radio resource control configuration configures the at least one prediction window.

14. The apparatus of claim 11, wherein the instructions, when executed by the at least one processor, cause the apparatus at least to:
receive, for the at least one channel state information quantity for which prediction is configured or enabled, either a model valid for the at least one prediction window, or multiple quantized values of the at least one channel state information quantity spanning the at least one prediction window.

15. The apparatus of claim 11, wherein the instructions, when executed by the at least one processor, cause the apparatus at least to:
receive at least one prediction window shift indicator; and
receive, for the at least one channel state information quantity for which prediction is configured or enabled, either a model valid for a shifted at least one prediction window or multiple quantized values of the at least one channel state information quantity spanning the shifted at least one prediction window.

16. The apparatus of claim 11, wherein the receiving of the channel state information report is either:
aperiodic in response to transmitting downlink control information triggering channel state information reporting containing the at least one channel state information quantity for which prediction is configured or enabled; or periodic or semi-persistent in response to transmitting the at least one downlink reference signal and/or the downlink channel for the at least one channel and/or interference measurement.

17. A method comprising:

receiving a radio resource control configuration including at least one channel state information reporting configuration indicating at least one channel state information quantity for which prediction is configured or enabled;

receiving a downlink reference signal for interference measurement, or receive a downlink channel for at least one of: channel measurement, or and/or interference measurement;

performing at least one of the following:
- determining the at least one channel state information quantity, based on at least one of: a downlink channel decoding outcome, or at least one prediction window, or
- determining a channel state information prediction model, based on at least one of: a downlink reference measurement, or a downlink channel decoding outcome, or the at least one channel state information reporting configuration, or the at least one prediction window;

transmitting a channel state information report in uplink control information, based on the determining; and performing at least one of:
- selecting, for the at least one channel state information quantity for which prediction is configured or enabled, the at least one prediction window from multiple configured prediction windows, or
- selecting, for the at least one channel state information quantity for which prediction is configured or enabled, at least one shift coefficient to shift the at least one prediction window forward or backward in time.

* * * * *